United States Patent
Holz et al.

(10) Patent No.: US 11,777,595 B2
(45) Date of Patent: Oct. 3, 2023

(54) NON-GEOSTATIONARY SATELLITE COMMUNICATIONS NETWORK ARCHITECTURES WITH MESH NETWORK EDGE DATA CENTERS

(71) Applicant: Mangata Networks, Inc., Gold Canyon, AZ (US)

(72) Inventors: Brian G. Holz, Gold Canyon, AZ (US); Ken M. Mentasti, Louisville, CO (US)

( * ) Notice: Subject to any disclaimer, the term of this patent is extended or adjusted under 35 U.S.C. 154(b) by 0 days.

(21) Appl. No.: 18/064,064

(22) Filed: Dec. 9, 2022

(65) Prior Publication Data
US 2023/0110434 A1 Apr. 13, 2023

Related U.S. Application Data

(63) Continuation of application No. PCT/US2021/016480, filed on Feb. 3, 2021.

(51) Int. Cl.
*H04B 7/195* (2006.01)
*H04B 7/185* (2006.01)

(52) U.S. Cl.
CPC ......... *H04B 7/18563* (2013.01); *H04B 7/195* (2013.01)

(58) Field of Classification Search
CPC ........ H04B 7/15; H04B 7/185; H04B 7/1853; H04B 7/18563; H04B 7/195
See application file for complete search history.

(56) References Cited

U.S. PATENT DOCUMENTS

| | | | |
|---|---|---|---|
| 5,979,832 | A | 11/1999 | Draim |
| 9,876,563 | B1 | 1/2018 | Coleman et al. |
| 10,498,595 | B1 | 12/2019 | Narayanasamy et al. |
| 10,523,758 | B2 | 12/2019 | Coleman et al. |

(Continued)

FOREIGN PATENT DOCUMENTS

| | | | | |
|---|---|---|---|---|
| CN | 106788671 B | | 7/2019 | |
| EP | 3651376 A1 | * | 5/2020 | ......... H04B 7/18508 |

(Continued)

OTHER PUBLICATIONS

PCT International Patent Application No. PCT/US2021/016480, International Search Report and Written Opinion dated Nov. 22, 2021, 13 pp.

*Primary Examiner* — Blane J Jackson
(74) *Attorney, Agent, or Firm* — PCFB, LLC; Justin K. Flanagan

(57) ABSTRACT

This disclosure includes various examples and variations of communications networks that employ a satellite network with a plurality of HEO and/or MEO satellites. Regional data centers may be connected to the satellite via gateways. Edge devices may connect to the network through a plurality of edge micro data centers configured in a mesh network to provide distributed and dynamically allocatable compute and storage resources. Each edge micro data center may include a RAN controller to implement an O-RAN network (e.g., via a 5G Node B cell site) to provide end-user devices direct access to the distributed compute and storage resources of the mesh network of edge micro data centers without intermediary backhaul transport layers. Microwave links or other terrestrial network types may be employed to facilitate the mesh network of edge micro data centers.

17 Claims, 7 Drawing Sheets

(56) References Cited

U.S. PATENT DOCUMENTS

| | | |
|---|---|---|
| 2015/0158602 A1 | 6/2015 | Marshack |
| 2019/0028570 A1 | 1/2019 | Coleman et al. |
| 2019/0165852 A1 | 5/2019 | Coleman et al. |
| 2020/0007226 A1* | 1/2020 | Takagi ................. H04W 36/125 |
| 2020/0028908 A1 | 1/2020 | Coleman et al. |
| 2020/0274947 A1 | 8/2020 | Coleman et al. |
| 2021/0006328 A1* | 1/2021 | Kim ...................... H04W 72/23 |

FOREIGN PATENT DOCUMENTS

| | | | | |
|---|---|---|---|---|
| GE | 11202007134 | * | 1/2009 | ............ H04B 7/185 |
| WO | WO-9718128 A1 | * | 5/1997 | ........... B64G 1/1007 |
| WO | 2022169448 A1 | | 8/2022 | |

* cited by examiner

NON-GEOSTATIONARY SATELLITE COMMUNICATIONS NETWORK ARCHITECTURES WITH MESH NETWORK EDGE DATA CENTERS

RELATED APPLICATIONS

This Application is a continuation of PCT International Application No. PCT/US2021/016480, titled "Non-geostationary Satellite Communications Network Architectures with Mesh Network Edge Data Centers," filed on Feb. 3, 2021, which is hereby incorporated by reference in its entirety.

TECHNICAL FIELD

This application relates to satellite communication systems, mesh networking technologies, and data center infrastructure. More specifically, this application relates to telecommunication architectures and devices that operate on a combination of terrestrial networks and satellite networks.

DETAILED DESCRIPTION

Figure 1A:
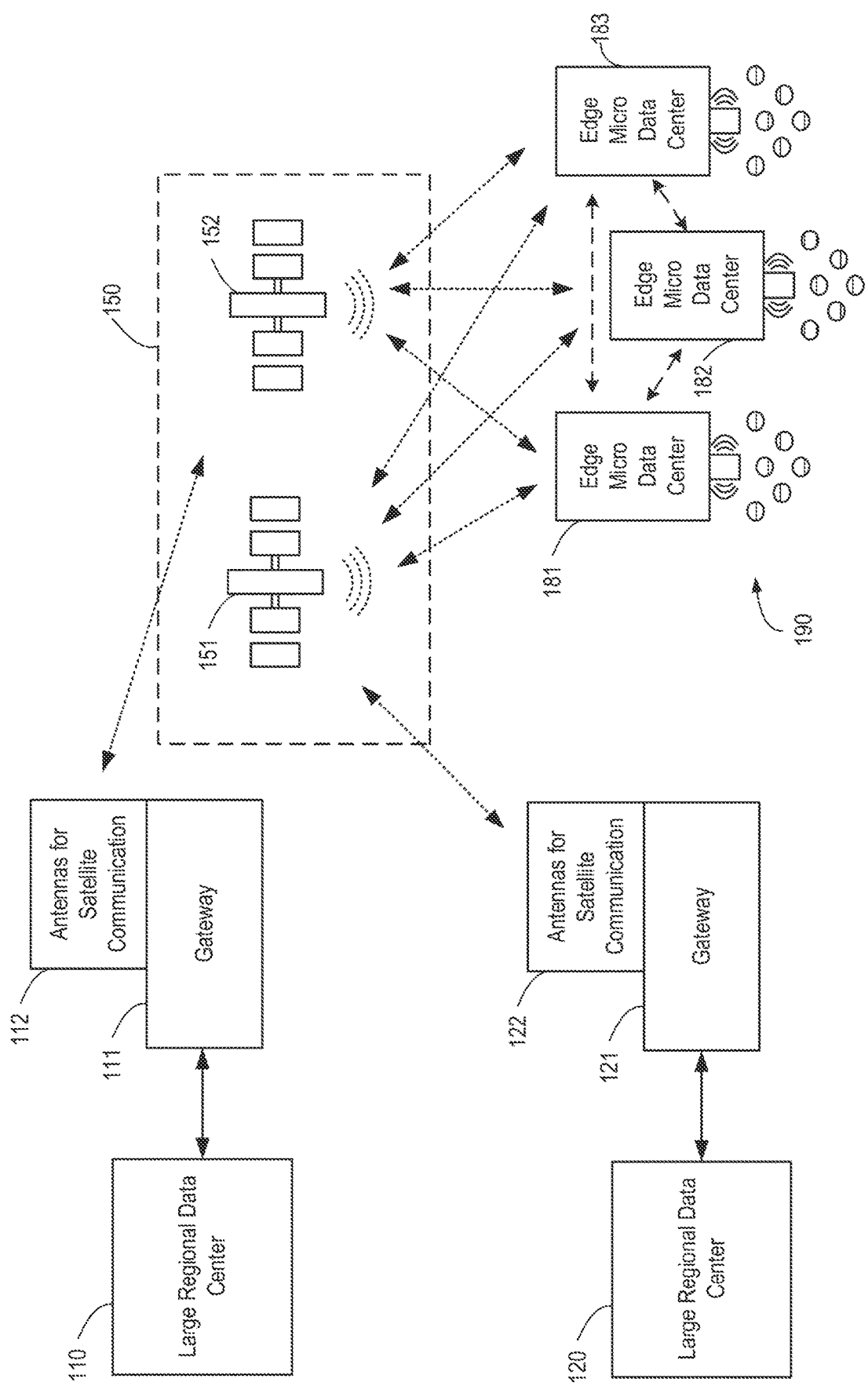
FIG. 1A illustrates a block diagram of an example communications system that includes a satellite network and mesh network of edge micro data centers, according to one embodiment.

The present disclosure includes descriptions and examples of systems, devices, apparatuses, and methods related to communication networks that utilize terrestrial and satellite communication equipment. Various embodiments of the systems and methods described herein utilize non-geostationary (NGSO) satellite communications network architectures. Some embodiments described herein utilize communication satellites that orbit the earth in a highly elliptical orbit (HEO) and/or communication satellites in a medium Earth orbit (MEO). HEO satellites are generally characterized by their elongated and inclined orbits providing improved coverage over high latitudes (either in the Northern or Southern hemisphere). MEO satellites are generally characterized as orbiting at an altitude between low Earth orbit (<2,000 kilometers above sea level) and geosynchronous orbit (≈35,786 kilometers above sea level). A satellite network may be scalable over time and include various combinations of HEO and MEO satellites. For instance, the satellite network may initially include only HEO satellites with MEO satellites being deployed as bandwidth needs increase both regionally and/or globally.

In various embodiments, the satellite network may communicate with terrestrial gateways, internet of things (IoT) device networks, cellular networks, such as 5G or long-term evolution (LTE), Wi-Fi networks, low-power wide-area networks (LPWAN) (e.g., LoRa), and/or other networks using any of a wide variety of hardware and/or software protocols. The satellite network may facilitate virtual networks of geographically spaced devices and/or virtual networks between devices operating on different communication protocols. For example, the satellite network may facilitate the creation of a virtual network that includes devices communicating via a cellular network (e.g., 5G, 4G, LTE, or another cellular network communications standard) and devices communicating on a Wi-Fi network. A virtual network may take the form of a software-defined network (SDN) or a software-defined wide area network (SDWAN) using local processing to virtualize the network control mechanisms. In various embodiments, an SDN or SDWAN may be controlled, configured, and/or operated using the satellite network.

In some embodiments, terrestrial gateways may be co-located with large regional data centers. The terrestrial gateways may be controlled and configured from network operations centers connected to the terrestrial gateways via terrestrial fiber. User terminals supporting micro edge data centers may be controlled and configured via the satellite network. Gateways associated with large regional data centers may connect and communicate with the satellite network via, for example, the Q-band (≈36 to 46 gigahertz) for downlink and the V-band (≈40 to 75 gigahertz) for uplink.

In some embodiments, edge micro data centers may be deployed with compute capabilities, memory, data storage, and the like to distribute content and execute applications at the edge of the network. The edge micro data centers may be part of a mesh network implemented via integrated or connected terrestrial network interfaces. For instance, groups of edge micro data centers may be connected in mesh networks implemented via terrestrial networks such as point-to-point microwave communications, Wi-Fi, cellular connections (e.g., 5G, LTE, 4G, or the like), fiber optic connections, coaxial cable connections, and/or the like. One or more of the edge micro data centers in the mesh network may be connected to the satellite network. Each of the edge micro data centers in the mesh network may be configured and controlled via communications transmitted via the satellite network. In some embodiments, one or more of the edge micro data centers may support an open radio access network (O-RAN) protocol to facilitate third-party equipment interfaces.

The edge micro data centers may, for example, be used by internet service providers (ISPs) to support other communication protocols and/or to support a software as a service (SaaS) application, a platform as a service (PaaS) application, and/or an infrastructure as a service (IaaS) application. The applications and data on an edge micro data center may be updated, modified, or controlled by commands sent via the satellite network. In some embodiments, each edge micro data center may include an integrated or connected commercially available cellular network base station, a Wi-Fi access point, a LoRa access point (e.g., an IoT access point), and/or an O-RAN device. More specifically, an edge micro data center may include a radio access network (RAN) controller to control radio communications with end-user devices connected via a cellular network connection (e.g., via a 5G Node B cell site).

As an example, a group of end-users may utilize edge devices that communicate with an edge micro data center via an edge communication protocol. Some of the end-users may, for example, use edge devices that communicate with the edge micro data center via 5G, LTE, and/or other cellular communication protocols. Other end users may use edge devices that communicate with the edge micro data center via Wi-Fi, Ethernet, fiber-optic cables, or the like. Examples of edge devices include IoT devices, personal computers, mobile phones, tablet devices, smart devices, wearable devices, automobiles, and the like.

Some geographic locations may have a single edge micro data center. Other geographic locations may have multiple edge micro data centers that are connected in a mesh network. The mesh network of edge micro data centers may share compute resources. For instance, if one edge micro data center is overloaded with end-user requests or compute processes, some requests or processes may be offloaded and handled by another edge micro data center in the mesh network. The mesh network of edge micro data centers provides distributed computing resources that are locally connected via wireless or wired communication hardware and protocols and globally connected via the satellite network.

In some embodiments, each edge micro data center is in communication with the satellite network via, for example, the K/Ka-band. In other embodiments, only one or some of the edge micro data centers in a local mesh network are connected to the satellite network. According to various embodiments, edge micro data centers may cache data from other edge micro data centers using the mesh network, thereby utilizing only a single link over the satellite network. The mesh network of edge micro data centers provides high availability via geographically separated satellite links. For example, a mesh network may include multiple edge micro data centers that are geographically separated by several kilometers (e.g., an average of 2-10 kilometers in some embodiments). Even if some of the edge micro data centers are unable to connect directly to the satellite network (e.g., via technical issues, weather issues, line-of-site disruptions, etc.), other networked edge micro data centers in geographically separated locations may still be connected to the satellite network.

As described in greater detail below, the meshed network of edge micro data centers may also facilitate network traffic and/or computational load balancing. For instance, one edge micro data center with congested network traffic may offload (e.g., route) some of the network traffic to another micro edge data center within the meshed network before sending such traffic over the satellite network. The meshed network provides high network reliability by routing traffic around outages caused by weather and/or other temporary network outages to maintain connectivity over the satellite network.

In some embodiments, a solar array and/or energy storage device (e.g., battery, capacitor, flywheel, etc.) may be installed with each edge micro data center to provide primary power or backup power. As an example, an edge micro data center may be embodied as a ruggedized secure container with multiple equipment bays. The size of each equipment bay within the container may be defined in terms of the number of standard rack units or "U" that it can accommodate.

For example, an edge micro data center may include one or more equipment bays (e.g., a plurality of 21 U or other sizes of equipment bays). An antenna may facilitate communication between the edge micro data center and one or more satellites in the satellite network. In some embodiments, a flat or planar satellite antenna (e.g., a dynamically tunable phased array antenna or a metasurface antenna) may be secured to the top surface of the container to communicate with the satellite network via the Ka-, Q-, and/or V-bands.

In some embodiments, one band may be used for uplink and another for downlink. In some embodiments, one band (e.g., a higher frequency Q- or V-band) may be used for communication between the satellite network and gateways of large regional data centers and another band (e.g., a lower frequency Ka-band) may be used for communication between the satellite network and the antenna of an edge micro data center. In some embodiments, the satellite network may use higher frequency Q and V bands for downlink and uplinks, respectively, but revert to the lower frequency Ka-band for both downlink and uplink when weather or other atmospheric conditions disrupt communications at higher frequencies. Accordingly, the satellite network may include a plurality of HEO satellites and/or MEO satellites that each include multiple antennas for communicating on different frequency bands (e.g., the Ka-band, the Q-band, and/or the V-band).

Traditional parabolic reflector antennas are physically moved and pointed toward a satellite. Accordingly, parabolic reflector antennas must be repositioned to communicate with a different satellite in a different location. In contrast, flat or planar antennas allow for electronic beamforming for time-multiplexed communication with multiple satellites, rapid switching to a backup satellite in response to communication disruption with a primary satellite, or simultaneous communication with multiple satellites (e.g., multiple, concurrent beamforming). Examples of planar antennas include, but are not limited to, electronically steerable arrays, phased arrays, dynamically tunable metasurface antennas, antennas utilizing Luneburg lenses, mechanical phased arrays, electronically controlled phased arrays, hybrid mechanical-electrical phased arrays, and the like. In various embodiments, an antenna subsystem, including an antenna controller and/or a planar antenna, may utilize the compute resource of a connected edge micro data center to determine beamforming and other control operations.

A communications network that includes a satellite network in communication with a terrestrial cellular network allows for multiple logical networks to be simultaneously maintained on the same, shared physical network infrastructure. Accordingly, end-to-end virtual networks can be maintained that provide both networking and storage functions. Operators can control and manage virtual networks for diverse 5G or LTE applications with different throughput, latency, and availability demands by partitioning network resources to different users. Various embodiments of the presently described communications networks facilitate virtual network slicing with a satellite layer and distributed computing resources in the form of edge micro data centers.

In some embodiments, the satellite network may provide end-to-end physical layer time synchronization information. In some implementations, networking equipment may utilize global satellite positioning (GPS) satellite signals for time synchronization. The presently described systems and methods allow for network-based time synchronization via the communication satellite network.

In embodiments in which the satellite network includes HEO satellites and MEO satellites, the HEO satellites may be configured with elliptical (e.g., highly eccentric) orbits that circumvent the earth in the same period of time as the MEO satellites. Scheduling and signal handoff between HEO satellites and MEO satellites are simplified when the HEO satellites and MEO satellites have identical orbit times. As a specific example, the HEO satellites and MEO satellites may both be configured with orbit periods each with a 4-hour orbit time.

A resource manager may selectively control the connectivity between each of the distributed HEO and/or MEO satellites and each of the plurality of geographically separated terrestrial gateways. For example, the resource manager may identify a satellite (HEO or MEO) coming up for contact with one of three possible gateways based on, for example, network demand. As another example, the resource manager may direct a gateway to connect to one of a plurality of available satellites based on the network load on each available satellite and/or detected or reported weather conditions between the gateway and each of the available satellites.

For instance, the resource manager may determine that storm clouds are likely to disrupt existing communications between a gateway and a first satellite. The resource manager may direct the satellite to connect to a different gateway to avoid potential disruption. In some embodiments, the resource manager is manually controlled by an operator in a network operations center. In other embodiments, the resource manager may be automated or operate according to a defined set of network operation rules, performance parameters, and customer service level agreements. The multiple HEO and/or MEO satellites provide spatial and angular diversity for communication channels between each gateway and at least one of the satellites. For example, the resource manager may direct a gateway to communicate with a satellite in an entirely different direction based on reported weather conditions in another direction.

In some embodiments, a resource manager may also implement and manage quality of service (QoS) traffic management. For instance, the resource manager may cause a gateway to transmit buffered video content that is not latency-sensitive via a HEO satellite and latency-sensitive data via a MEO satellite. In such embodiments, the resource manager may cause the gateway to switch back and forth between two (or more) different satellites (or satellite orbit types) depending on the QoS prioritization associated with different network packets. As described herein, a metasurface antenna or other electronically controlled beamforming antenna (e.g., a planar antenna) may quickly switch between different satellites as directed by the resource manager and/or predefined traffic flow rules. Accordingly, whether the gateway is associated with a large regional data center, a stationary edge micro data center, or a mobile edge micro data center (e.g., on an airplane, vehicle, boat, or the like), the antenna can be electronically switched between multiple satellites.

The preceding examples and embodiments may be used in any combination of embodiments and implementations. As an example, a gateway antenna system located in a large regional data center in a first city may upload video content to a first edge micro data center in a second city. The first edge micro data center may distribute the video content to other edge micro data centers within the city via terrestrial networks. End-users within the city may access the video content stored on nearby edge micro data centers via 5G or other terrestrial networks. Traffic on the satellite network due to each end user's request for the video content is reduced through the use of distributed edge micro data centers.

Data requested by an end-user that is not available on an edge micro data center would be provided by the large regional data center via the satellite network. The edge micro data center and/or other locally networked edge micro data centers may cache the requested data to make it available for future end-user requests.

As another example, edge micro data centers may include applications that utilize local compute power to reduce network traffic on the satellite network. For example, a national or global security company may sell sensors (e.g., cameras, motion detectors, temperature sensors, smoke alarms, and/or other IoT sensors and devices). End-users may install a combination of sensors in their homes. The sensors may provide data that is processed by cloud-based software. In one embodiment, the cloud-based software may be executed in a centralized large regional data center. In such an embodiment, data from all the sensors would be routed over the satellite network for processing and the results of such processing would be returned to the end user via the satellite network.

In another embodiment, one or more of the edge micro data centers in the local region of the end-user may implement the cloud-based processing of the sensor data. The distributed compute and storage functionalities provided by the edge micro data centers reduce network traffic on the satellite network and potentially improve performance with decreased latency. In some instances, some data that is not expected to be used as frequently by end-users in a given locale may be moved from the local network of edge micro data centers to a large regional data center via the satellite network. For example, video from a security camera may be initially analyzed and stored in an edge micro data center to reduce immediate network traffic on the satellite network. At convenient times of lower network traffic on the satellite network, stored video older than three days may be moved to large regional data centers.

In the various embodiments described herein, the edge micro data centers are connected in a mesh network to provide distributed and shareable compute and storage resources. Additionally, one or more of the edge micro data centers in a given mesh network are directly connected to the satellite network. Gateways of large regional data centers can send and receive data via the satellite network to the edge micro data centers. Network operations centers can command and control the edge micro data centers via the satellite network. In some instances, virtual private networks may be created that utilize the satellite network to include a combination of local and remote devices.

Edge micro data centers provide a distributed mesh network for compute resources and data storage with direct links to a multi-user RAN (e.g., 5G, LTE, Wi-Fi, etc.). Unlike traditional data centers that route data requests through network operator distribution networks, the presently described mesh network of edge micro data centers is directly accessible to end-user devices through radio access points.

According to the various embodiments described herein, a specific example of a communications network includes a satellite network with a plurality of HEO satellites and/or MEO satellites. A regional data center with regional computing resources and regional data storage resources may communicate with the satellite network via a regional gateway. The regional gateway may include one or more antennas to communicate with the satellite network via one or more frequency bands (e.g., the Ka-band, the V-band, and/or the Q-band).

The communications network may further include a plurality of edge micro data centers in a mesh network. One, multiple, or all the edge micro data centers in the mesh network may include an antenna (e.g., a planar metasurface antenna) to relay data between edge micro data centers in the mesh network and the satellite network. The edge micro data centers may be directly connected to the satellite network via the antennas as part of a virtual network without a traditional gateway architecture as utilized by the regional data center.

Each edge micro data center includes a RAN controller to control radio communications with end-user devices in a RAN, such as a 5G network or a Wi-Fi network (e.g., an O-RAN network). Any of a wide variety of end-user devices may be directly connected to and directly access data and compute resources within the edge micro data center and/or communicate with remote devices via the satellite network.

Traditional LTE and 5G network architectures include a multi-access edge computing layer that connects a sidehaul layer to a backhaul layer, where the sidehaul layer connects to a midhaul layer and a fronthaul layer before reaching end-user devices. The presently described architecture includes edge micro data centers with multi-access edge computing (MEC) controllers that, among other things, implement adaptive mesh management of distributed compute resources and storage resources of each respective edge micro data center in the mesh network of edge micro data centers connected via the microwave link interface.

Additionally, a MEC controller may implement virtual network routing and network slicing to manage virtual networks that include end-user devices connected to the RAN controller. For example, the MEC controller may manage network slicing and virtual networks that include multiple end-user devices, multiple edge micro data centers 181, 182, and 183, and/or devices and application services on the other end of the satellite network. Accordingly, end-user devices have direct access to the compute resources and data storage resources of the edge micro data center via the RAN controller. In many instances, the presently described architecture eliminates the midhaul, sidehaul, and (in instances when the satellite network is not used) the backhaul layers of traditional LTE and 5G network architectures.

In various embodiments, an edge micro data center may include an antenna controller to control the beamforming of the planar antenna. The planar antenna may be reconfigured to connect to and switch between different satellites. For example, the antenna controller may modify the beamforming of the planar antenna to preemptively switch from communicating with a first satellite in the satellite network to a second satellite in the satellite network in response to disruptions caused by interference, weather, and/or forecasted weather-based disruptions between the planar antenna and the first satellite. As another example, the antenna controller may control the beamforming of the planar antenna to switch between a highly elliptical orbit (HEO) satellite in the satellite network and a medium earth orbit (MEO) satellite in the satellite network based on a latency prioritization associated with a data packet (e.g., to implement a QoS ruleset).

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like.

A processor may include a special-purpose processing device, such as application-specific integrated circuits (ASIC), programmable array logic (PAL), programmable logic array (PLA), a programmable logic device (PLD), a field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

FIG. 1A illustrates a block diagram of an example communications system that includes a satellite network 150 of multiple satellites, including HEO satellites and/or MEO satellites. In the simplified illustration, only two satellites 151 and 152 are illustrated. However, it is appreciated that any number of satellites may be included. Large regional data centers 110 and 120 may communicate via traditional gateway architectures with the satellite network 150 via gateways 111 and 121 and antennas 112 and 122. The antennas 112 and 122 may facilitate data relay with the satellite network 151 using the Ka-band, the Q-band, and/or the V-band.

The simplified illustration of a communications network further includes three edge micro data centers 181, 182, and 183. Each edge micro data center 181, 182, and 183 includes an antenna subsystem to communicate with the satellites 151 and/or 152 in the satellite network 150. The antenna subsystem may include an electronically controlled beamforming planar antenna, such as an electronically steerable antenna array, a phased array of antennas, a dynamically tunable metasurface antenna, one or more antennas utilizing one or more Luneburg lenses, and/or combinations thereof. The edge micro data centers 181, 182, and 183 constitute a distributed computing environment of compute and storage resources in a mesh network. As described herein, a terrestrial network such as a point-to-point microwave network may facilitate the mesh network of edge micro data centers 181, 182, and 183.

Each edge micro data center 181, 182, and 183 may further include a RAN controller to control radio communications with end-user devices 190 in a Wi-Fi network, cellular network (e.g., 5G, LTE, 4G, or the like), LoRa network, LTE network, or another network suitable for last-mile end-user connections. As described in greater detail in other parts of this disclosure, each edge micro data center 181, 182, and 183 may further include a MEC controller. The MEC controller of each edge micro data center 181, 182, and 183 may cooperate with the MEC controller of each other edge micro data center 181, 182, and 183 to implement adaptive mesh management of the distributed compute resources and storage resources of the collective edge micro data centers 181, 182, and 183. The MEC controller may further manage and implement virtual network routing of data packets from end-user devices 190 connected to the RAN. The MEC controller may further manage network slicing and virtual networks that include multiple end-user devices, multiple edge micro data centers 181, 182, and 183, and/or devices and application services on the other end of the satellite network.

Figure 1B:
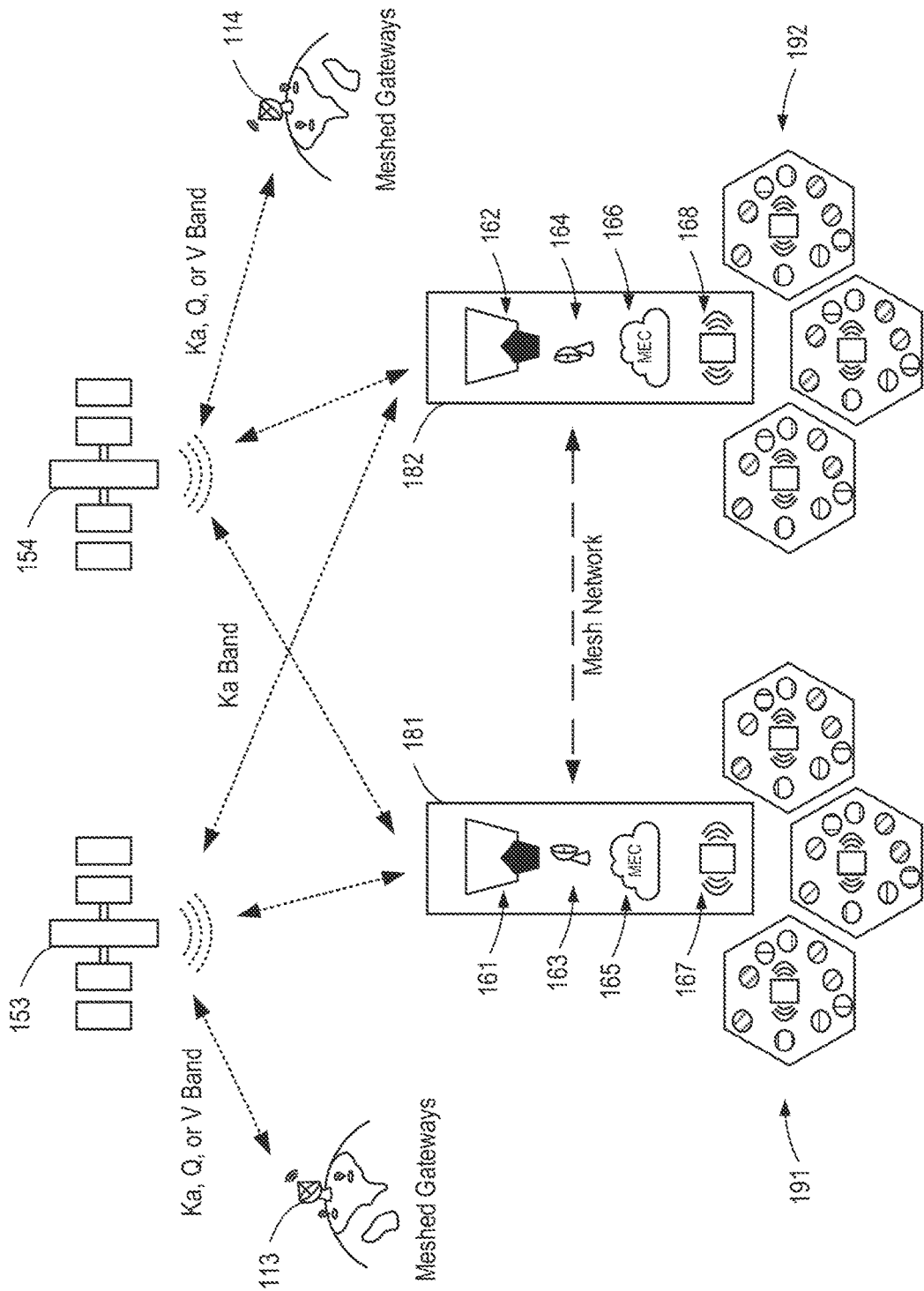
FIG. 1B illustrates a block diagram of an example communications system that includes a satellite network and mesh network of edge micro data centers, according to one embodiment.

FIG. 1B illustrates a block diagram of another example communications system that includes a satellite network with satellites 153 and 154 (e.g., HEO and/or MEO satellites) and a mesh network of edge micro data centers 181 and 182, according to various embodiments. Meshed gateways 113 and 114 associated with large data centers communicate with antennas on the satellites 153 and 154 via the Ka-, Q-, and/or V-band. The edge micro data centers 181 and 182 are each in communication with multiple satellites 153 and 154 via the planar antennas 161 and 162, respectively, using frequencies in the Ka-band.

Each edge micro data center 181 and 182 is illustrated with functional blocks representing a planar antenna that can be dynamically tuned or reconfigured for beamforming signals to the satellites 153 and 154 in the Ka-band. Terrestrial network devices 163 and 164 facilitate the creation of a terrestrial mesh network between the edge micro data centers 181 and 182. The MEC controllers 165 and 166 implement adaptive mesh management of the distributed compute and storage resources. The MEC controllers 165 and 166 also implement virtual network routing and virtual network slicing to include end-user devices connected to the RAN controllers 167 and 168. In the illustrated embodiment, the RAN controllers 167 and 168 cooperate with multiple access points 191 and 192, each of which is connected to diverse types of end-user devices utilizing diverse network protocols.

Figure 2B:
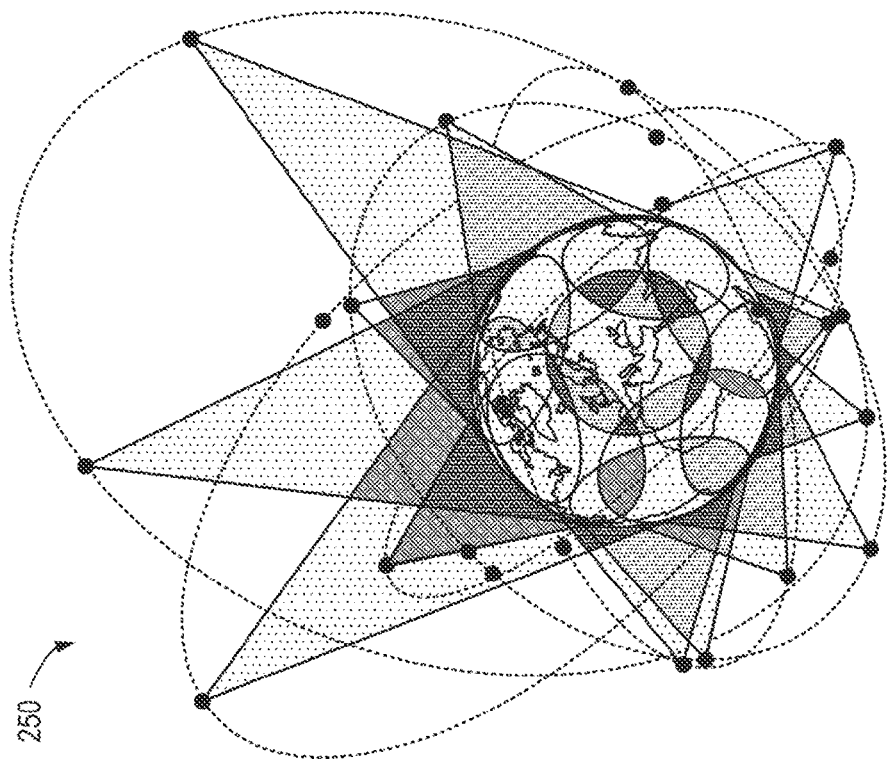
FIG. 2B illustrates a simplified diagram of satellite coverage provided via a combination of HEO satellites and medium earth orbit (MEO) satellites, according to one embodiment.
Figure 2A:
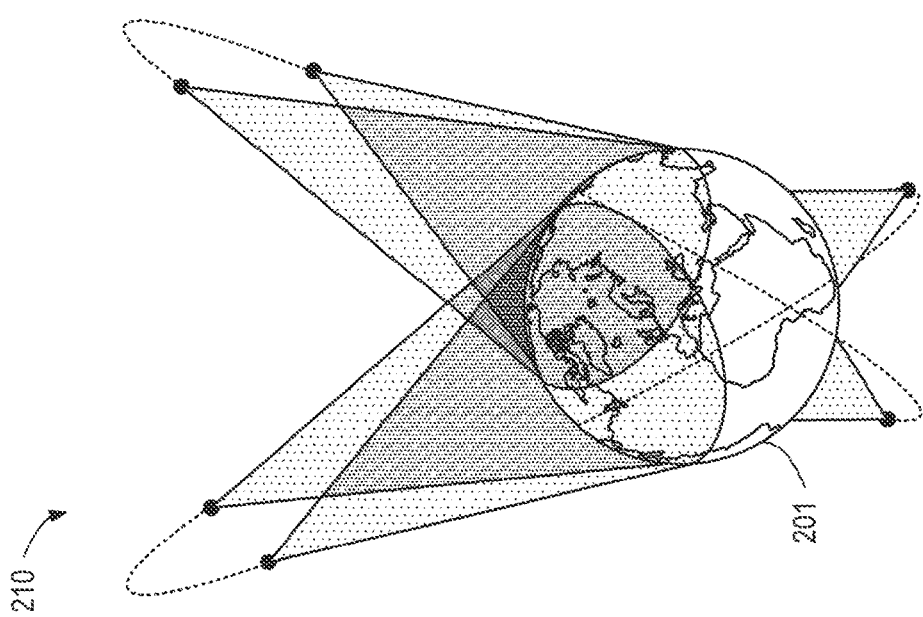
FIG. 2A illustrates a simplified diagram of satellite coverage provided via a plurality of highly elliptical orbit (HEO) satellites, according to one embodiment.

FIG. 2A illustrates a simplified diagram of satellite coverage 210 provided via a plurality of highly elliptical orbit (HEO) satellites, according to one embodiment. As illustrated, the HEO satellites provide greater coverage and dwell time on the portion of Earth 201 near the apogee of the orbit. The orbit of the HEO satellites may be highly eccentric, as described herein.

FIG. 2B illustrates a simplified diagram of satellite coverage 250 provided via a combination of HEO satellites and medium earth orbit (MEO) satellites, according to one embodiment. As illustrated, the addition of the MEO satellites increases the total coverage 250 on the Earth. Additionally, the MEO satellites are closer to the Earth and can provide lower-latency communications. The unique combination of HEO and MEO satellites in the satellite network provides robust coverage, redundant access to satellites for most terrestrial installations, and latency QoS options for routing data that is sensitive to latency. Furthermore, the combination of HEO and MEO satellites in the satellite network provides the aforementioned benefits while minimizing or reducing the cost and/or the total number of satellites, as compared to a similar coverage and functionality using a low Earth orbit (LEO) constellation, MEO-only constellation, or HEO-only constellation.

Figure 3:
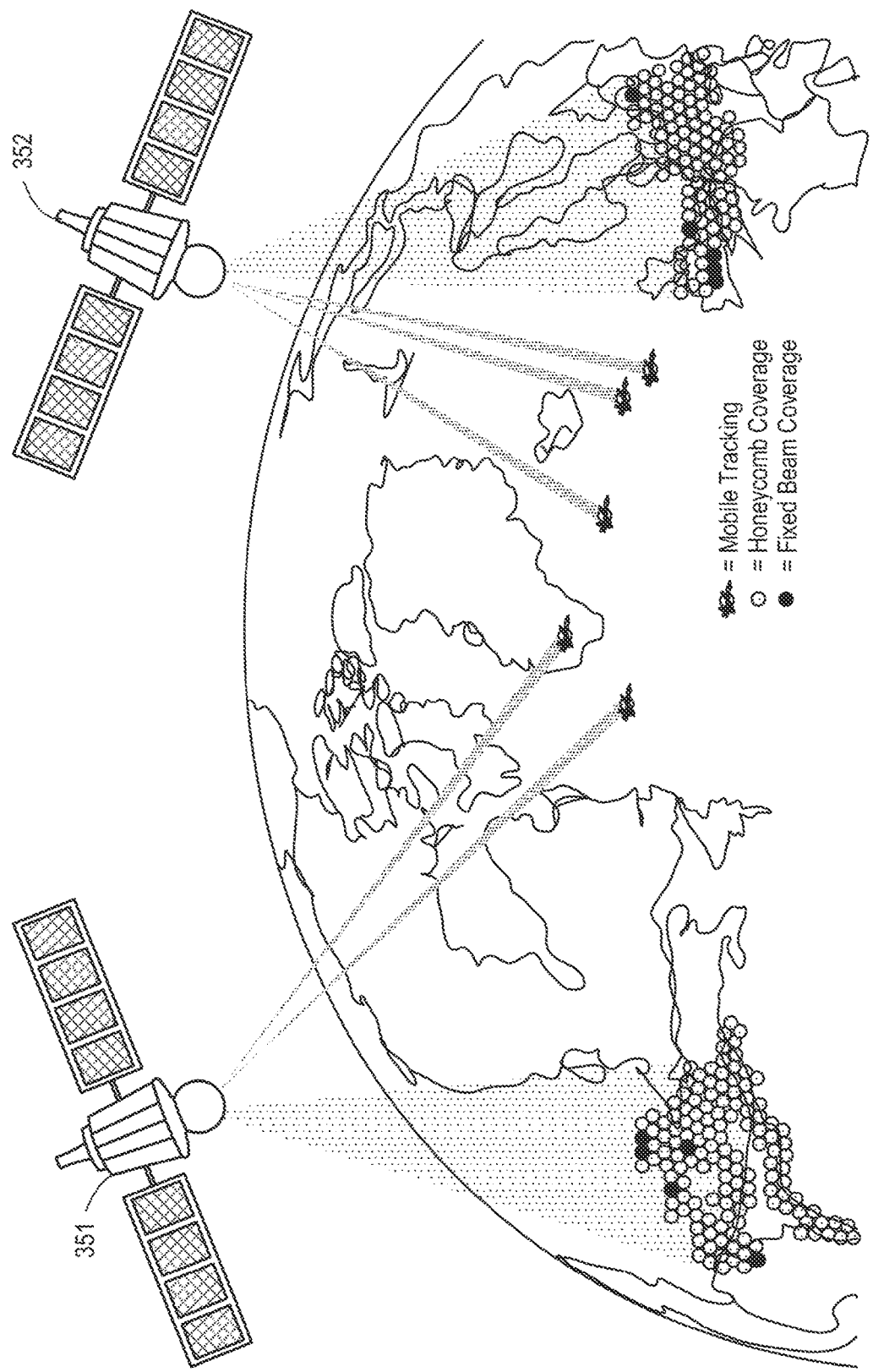
FIG. 3 illustrates a simplified diagram of satellite connectivity provided via a combination of fixed beams, honeycomb beam coverage, and mobile tracking beams, according to one embodiment.

FIG. 3 illustrates a simplified diagram of satellite connectivity provided by two example satellites 351 and 352. As illustrated, each satellite 351 and 352 may provide a combination of fixed beams (black circles), honeycomb beam coverage (hexagonal cells), and mobile tracking beams (illustrated as airplanes), according to one embodiment. In contrast with geostationary or geosynchronous (GEO) satellites, the beam angles and/or beam shapes and angular geometry of transmissions between terrestrial installations and the MEO and HEO satellites are constantly changing. Accordingly, moveable antennas or electronically reconfigurable (e.g., tunable) planar antennas are used to maintain the network links.

Figure 4:
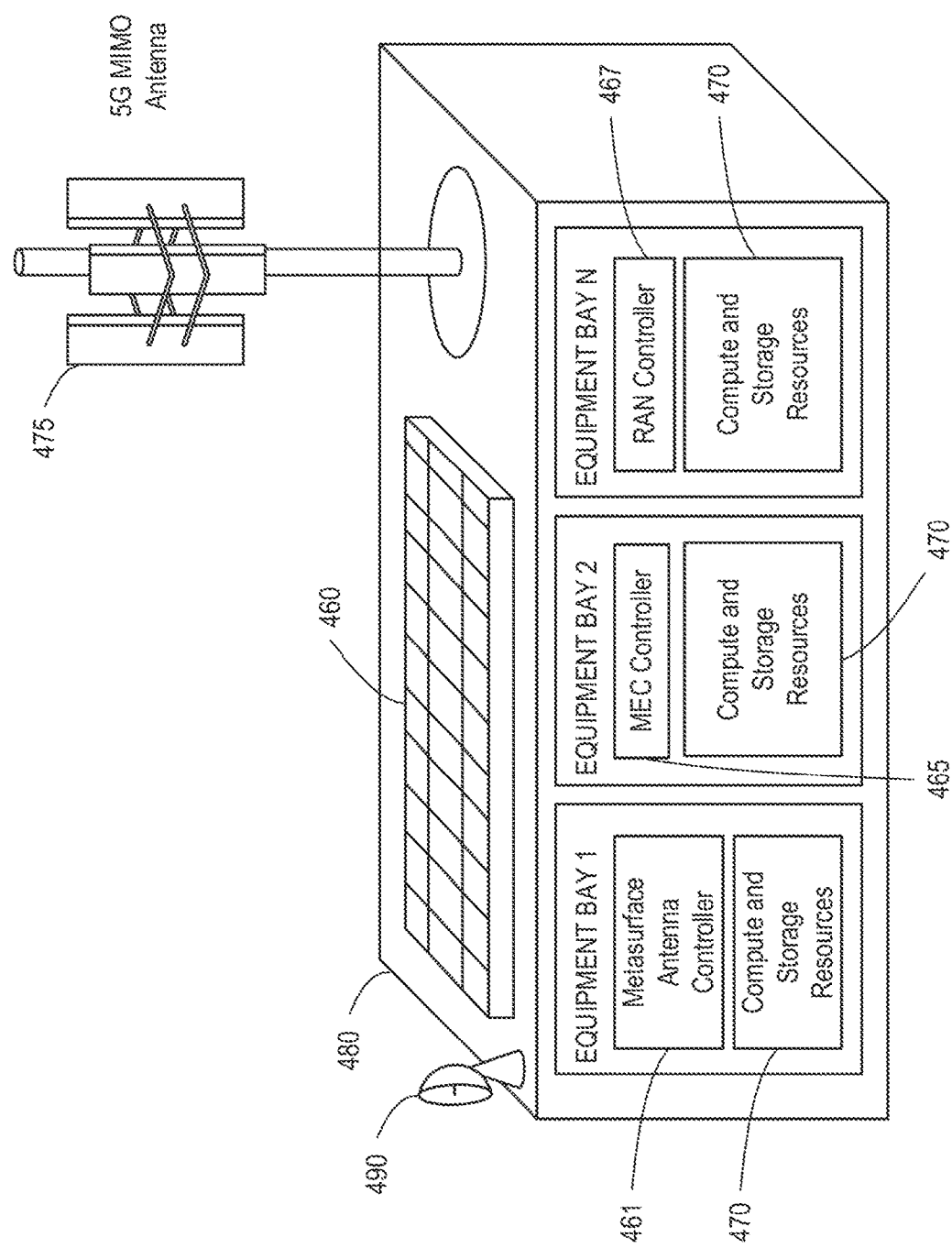
FIG. 4 illustrates a simplified block diagram of an edge micro data center with an integrated radio access network (RAN) controller and associated RAN antenna system, according to one embodiment.

FIG. 4 illustrates a simplified block diagram of an example edge micro data center 480 with an integrated RAN controller 467 and associated RAN antenna system 475, according to one embodiment. In various embodiments, the edge micro data center 480 may include a ruggedized secure container or housing. The edge micro data center 480 may be connected to a power source, such as grid power, a solar panel array, an uninterruptible power supply, a generator, or the like. In a specific example, the edge micro data center 480 includes three equipment bays with 21 U of standard rack space. The equipment bays may include or be provisioned with a wide variety of electronic and computer devices, including without limitation, power monitoring equipment, environmental monitoring equipment, network monitoring equipment, power distribution management devices, cooling systems, network devices, data storage, processors, satellite modems, antenna controllers, atomic clocks, GPS receivers, and/or the like.

As illustrated, the edge micro data center 480 may include an antenna controller 461 to control the beamforming of the planar antenna 460 to communicate with the satellite network via the Ka-band. The planar antenna 460 may be part of an antenna subsystem that includes one or more antennas. In some embodiments, the antenna subsystem may include the antenna controller 461 and the planar antenna 460, where the planar antenna 460 may include one or more actual antennas and/or antenna elements.

For example, in some embodiments, the antenna subsystem may include a single, electronically controlled beamforming planar antenna, such as a tunable metasurface. In some embodiments, the antenna subsystem may include a plurality of antennas operating in a phased array configuration. In other embodiments, the antenna subsystem may not be a planar antenna system and instead include one or more gimbaled antennas (e.g., physically moveable) utilizing parabolic reflectors. In embodiments in which the antenna subsystem is a planar antenna subsystem, the planar antenna subsystem may include one or more planar antennas embodied as, for example, an electronically steerable antenna array, a phased array, a dynamically tunable metasurface antenna, an antenna utilizing one or more Luneburg lens, and/or the like.

The RAN controller 467 may control radio communications with end-user devices. For example, the RAN controller 467 may facilitate the virtual networking and routing of data in an O-RAN. The illustrated embodiment includes a 5G MIMO antenna system (e.g., a 5G Node B cell site) to facilitate the direct connection of end-user devices to the edge micro data center 480 via a 5G network. It is appreciated that alternative cellular network standards and protocols may be utilized instead of or in addition to 5G cellular networks. Examples of such alternative cellular networks include, but are not limited to, LTE networks, 4G networks, and future-developed enhancements to and replacements for 5G cellular network protocols and standards.

The edge micro data center 480 may further include a terrestrial network interface 490 (e.g., a microwave transceiver) for point-to-point mesh networking with other local edge micro data centers. In other embodiments, the terrestrial network interface 490 may comprise a fiber optic interface, a coaxial cable interface, or another direct wireless or wired connection interface. Compute and storage resources 470 in the edge micro data center 480 and in other edge micro data centers in the mesh network may be utilized as distributed resources for dynamic allocation and usage by end-user devices connected throughout the mesh network. In various embodiments, a MEC controller 465 may implement adaptive mesh management, virtual networking, virtual routing, end-to-end virtual networks, artificial intelligence user profiling for traffic management, content caching, prefetching, and/or vertical network slicing.

In various embodiments, the edge micro data center 480 may include a control interface for direct control via the satellite network for capacity management, compute management, configuration, network management (e.g., software-defined network management), firmware upgrades, software installation, and the like. Accordingly, all aspects of the functionality of the edge micro data center 480 may be directly altered and controlled from a remote network operations control center via the satellite network.

As previously described herein, the antenna controller 461 may cause the planar antenna 460 to transmit some data to one satellite and other data to another satellite based on latency prioritization, traffic balancing, due to weather disruptions, due to predicted weather disruptions, and/or the like.

Figure 5A:
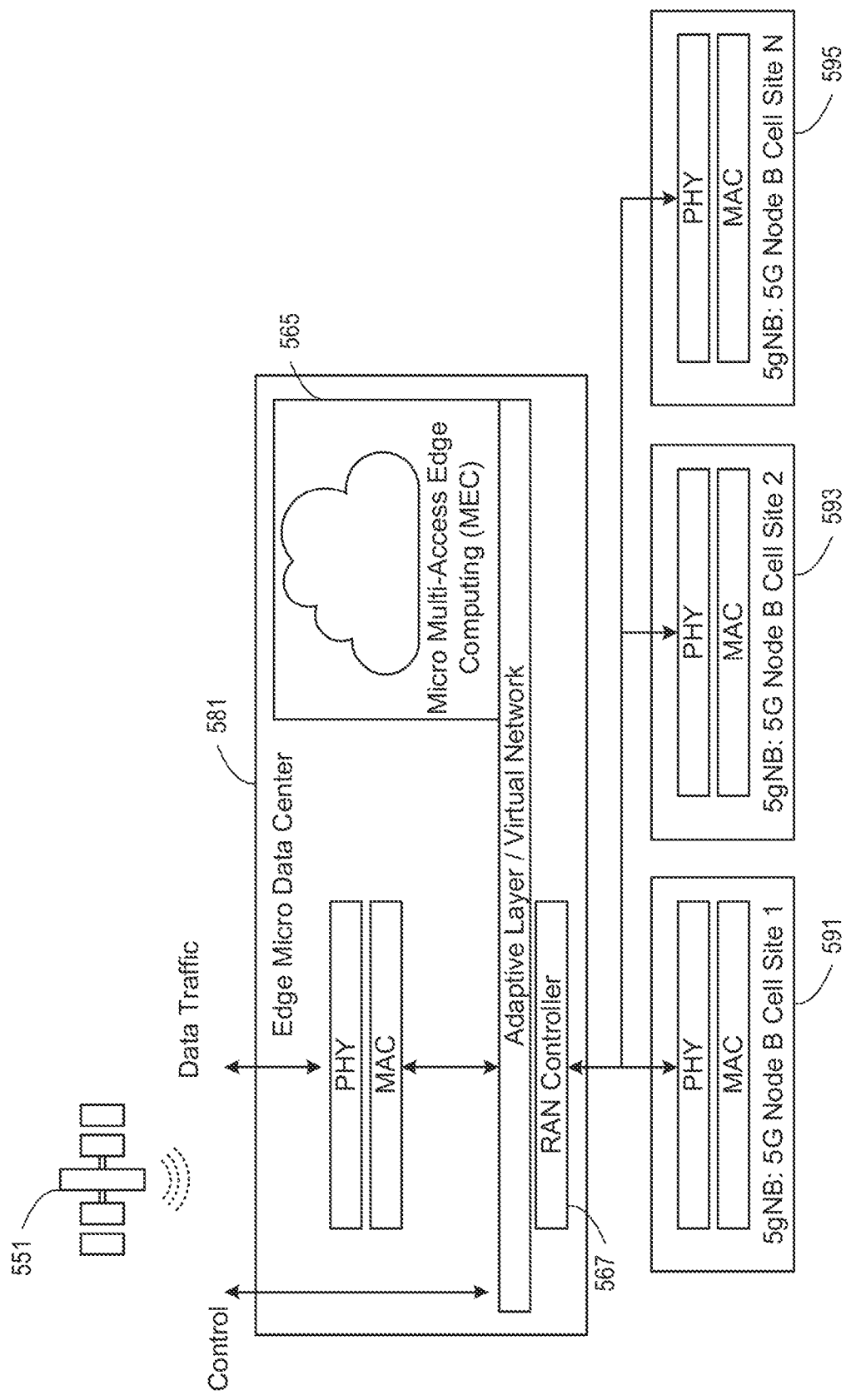
FIG. 5A illustrates a block diagram of an example protocol stack for a single edge micro data center, according to one embodiment.

FIG. 5A illustrates a block diagram of an example protocol stack for a single edge micro data center 581, according to one embodiment. As described herein, the edge micro data center 581 is connected to a satellite network 551. Control signals can be sent directly by the satellite network to control the adaptive virtual network layer of the protocol stack of the edge micro data center 581. The MEC controller 565 implements and manages virtual networking, routing, traffic management, and network slicing within the adaptive virtual network layer of the protocol stack of the edge micro data center 581.

In the illustrated example, the RAN controller 567 manages the radio access networks provided by three 5G Node B Cell Sites 591, 593, and 595. In combination with the MEC controller 565, the RAN controller 567 provides direct access to compute and storage resources of the edge micro data center 581 without any additional sidehaul or fronthaul network layer. In some instances, data or compute requests from an edge device connected to one of the three 5G Node B Cell Sites 591, 593, and 595 can be fulfilled by the storage and compute resources of the edge micro data center 581. In such instances, little or no network traffic is transmitted on the satellite network. In other instances, data is transmitted via the satellite network to access information or compute resources available only in remote locations.

Figure 5B:
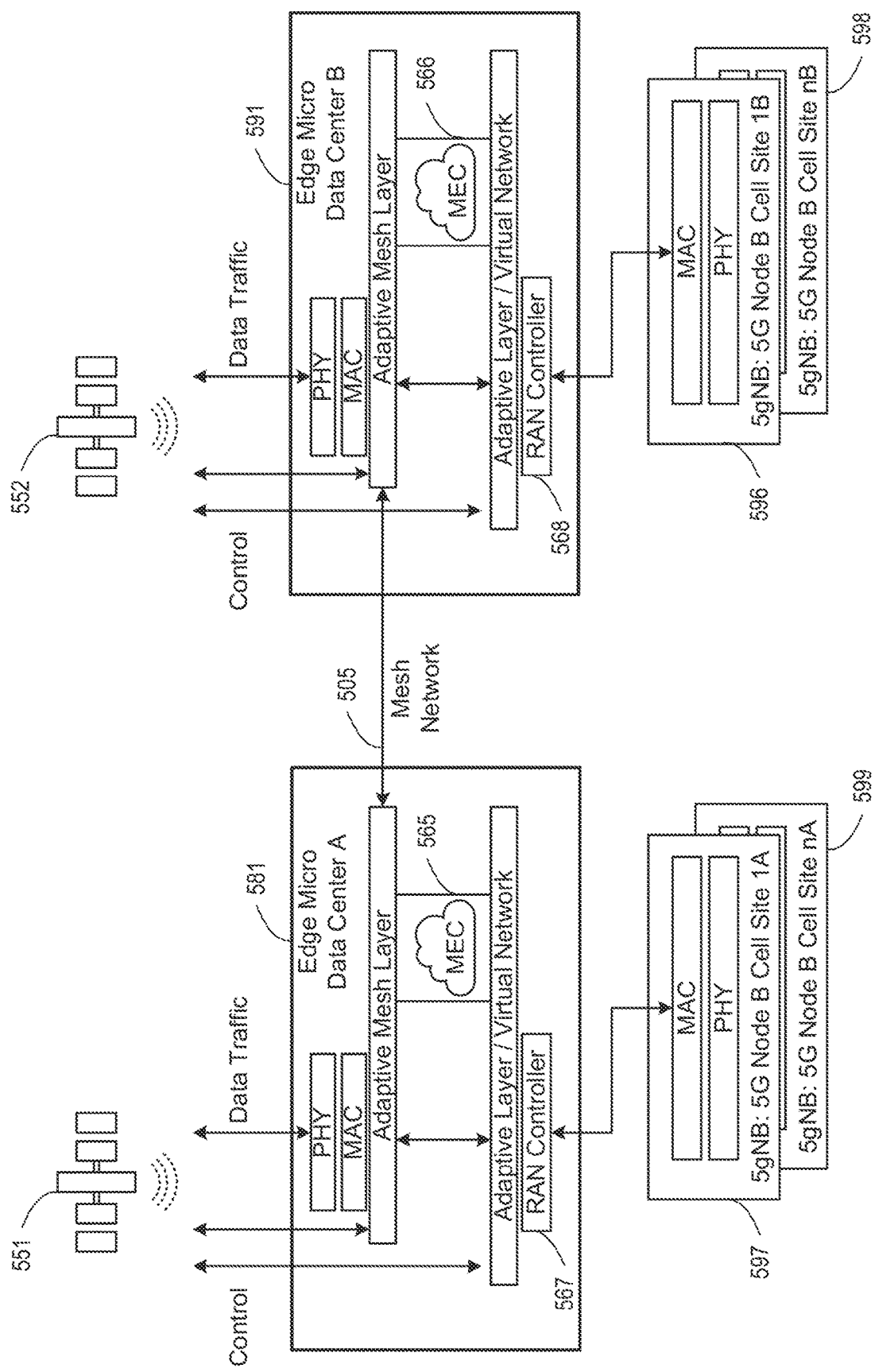
FIG. 5B illustrates a block diagram of an example protocol stack for multiple edge micro data centers connected in a mesh network, according to one embodiment.

FIG. 5B illustrates a block diagram of an example protocol stack for multiple edge micro data centers 581 and 591 connected in a mesh network 505 via terrestrial network devices that are distinct from the satellite network and the radio access network for end-user connections, according to one embodiment. Again, direct control instructions from the satellite network 551 and 552 may be used to manage, monitor, and/or control the adaptive mesh layer and adaptive virtual network layer via the MEC controllers 565 and 566. The MEC controllers 565 and 566 cooperate to manage and share the distributed compute and storage resources of the micro edge data centers 581 and 591. The MEC controllers 565 and 566 also cooperate with the RAN controllers 567 and 568 to manage virtual networking, network slicing, routing, and other network functions associated with the end-user devices connected to the wireless network access points (e.g., 5G Node B Cell Sites 1A-nA 597 and 599 and 5G Node B Cell Sites 1B-nB 596 and 598).

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The description above should be interpreted to encompass at least the following claims, which are hereby explicitly incorporated into this detailed description in their entireties, along with all feasible permutations and combinations of the dependent claims.

What is claimed is:

1. An edge micro data center for a communications network, comprising:
    an antenna subsystem to communicate with a satellite network, the antenna subsystem including at least one antenna and an antenna controller to control beamforming of the at least one antenna;
    wherein the antenna controller is configured to preemptively switch from communicating with a first satellite in the satellite network to a second satellite in the satellite network in response to a forecasted weather-based disruption;
    a terrestrial network interface to facilitate a mesh network with other local edge micro data centers;
    a radio access network (RAN) controller to control radio communications with end-user devices in an open radio access network (O-RAN);
    a multi-access edge computing (MEC) controller to:
        implement adaptive mesh management of distributed compute resources and storage resources of the edge micro data center in the mesh network of edge micro data centers connected via the terrestrial network interface, and
        implement virtual network routing to manage virtual networks that include end-user devices connected to the RAN controller; and
    a control interface to receive command and control instructions via the satellite network to modify the implementation of the adaptive mesh management and virtual network routing of the MEC controller.

2. The edge micro data center of claim 1, wherein the antenna subsystem is configured to communicate with the satellite network via Ka-band frequencies.

3. The edge micro data center of claim 1, wherein the terrestrial network interface comprises a microwave link interface.

4. The edge micro data center of claim 1, wherein the terrestrial network interface comprises at least one of: a fiber optic interface and a coaxial cable interface.

5. The edge micro data center of claim 1, wherein the RAN controller is configured to control radio communications with end-user devices connected to at least one of: a 5G Node B cell site and a Wi-Fi access point.

6. The edge micro data center of claim 1, wherein the at least one antenna comprises a planar antenna.

7. The edge micro data center of claim 6, wherein the planar antenna comprises an electronically tunable metasurface antenna.

8. The edge micro data center of claim 6, wherein the planar antenna comprises at least one of:
   an electronically steerable antenna array,
   a phased array of antenna elements, and
   an antenna architecture utilizing at least one Luneburg lens.

9. The edge micro data center of claim 6, wherein the antenna controller is configured to preemptively switch from communicating with the first satellite in the satellite network to the second satellite in the satellite network in response to the forecasted weather-based disruption by modifying a beamforming of the planar antenna.

10. An edge micro data center, comprising:
   an antenna subsystem to communicate with a satellite network, the antenna subsystem including at least one antenna and an antenna controller to control beamforming of the at least one antenna;
   wherein the antenna controller is configured to switch between a highly elliptical orbit (HEO) satellite in the satellite network and a medium earth orbit (MEO) satellite in the satellite network based on a latency prioritization associated with a data packet;
   a terrestrial network interface to facilitate a mesh network with other local edge micro data centers;
   a radio access network (RAN) controller to control radio communications with end-user devices in an open radio access network (O-RAN);
   a multi-access edge computing (MEC) controller to:
      implement adaptive mesh management of distributed compute resources and storage resources of the edge micro data center in the mesh network of edge micro data centers connected via the terrestrial network interface, and
      implement virtual network routing to manage virtual networks that include end-user devices connected to the RAN controller; and
   a control interface to receive command and control instructions via the satellite network to modify the implementation of the adaptive mesh management and virtual network routing of the MEC controller.

11. The edge micro data center of claim 10, wherein the antenna subsystem is configured to communicate with the satellite network via Ka-band frequencies.

12. The edge micro data center of claim 10, wherein the terrestrial network interface comprises a microwave link interface.

13. The edge micro data center of claim 10, wherein the terrestrial network interface comprises at least one of: a fiber optic interface and a coaxial cable interface.

14. The edge micro data center of claim 10, wherein the RAN controller is configured to control radio communications with end-user devices connected to at least one of: a 5G Node B cell site and a Wi-Fi access point.

15. The edge micro data center of claim 10, wherein the at least one antenna comprises a planar antenna.

16. The edge micro data center of claim 15, wherein the planar antenna comprises an electronically tunable metasurface antenna.

17. The edge micro data center of claim 15, wherein the planar antenna comprises at least one of: an electronically steerable antenna array,
   a phased array of antenna elements, and
   an antenna architecture utilizing at least one Luneburg lens.

* * * * *